(No Model.)

C. LEE.
SEED PLANTER.

No. 276,433. Patented Apr. 24, 1883.

WITNESSES
Chas. Nida
C. Sedgwick

INVENTOR:
C. Lee
Munn & Co
ATTORNEYS.

UNITED STATES PATENT OFFICE.

CHARLES LEE, OF DADEVILLE, MISSOURI.

SEED-PLANTER.

SPECIFICATION forming part of Letters Patent No. 276,432, dated April 24, 1883.

Application filed September 18, 1882. (No model.)

*To all whom it may concern:*

Be it known that I, CHARLES LEE, of Dadeville, in the county of Dade and State of Missouri, have invented a new and useful Improvement in Seed-Planters, of which the following is a full, clear, and exact description.

Reference is to be had to the accompanying drawings, forming part of this specification, in which similar letters of reference indicate corresponding parts in all the figures.

Figure 1:
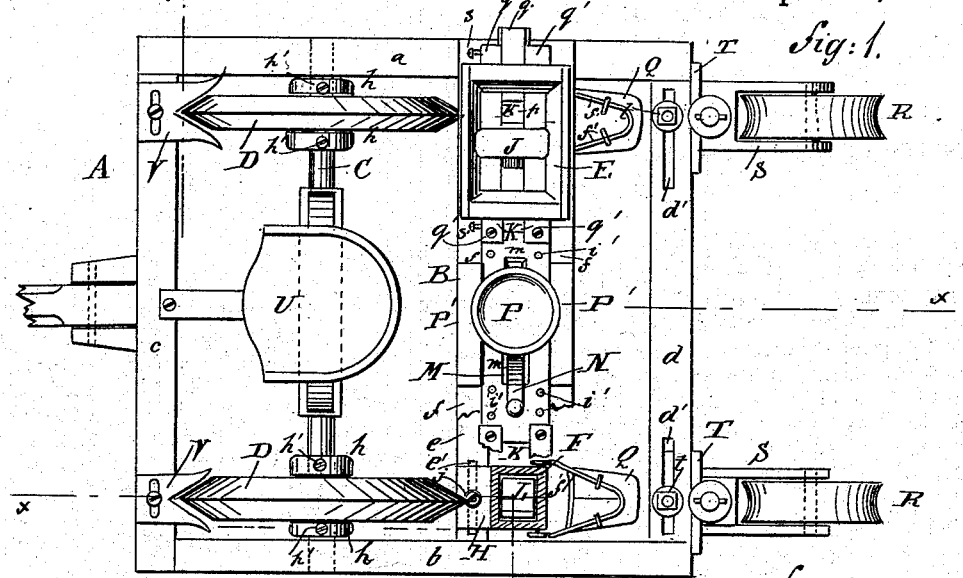
Figures 2, 4, 5:
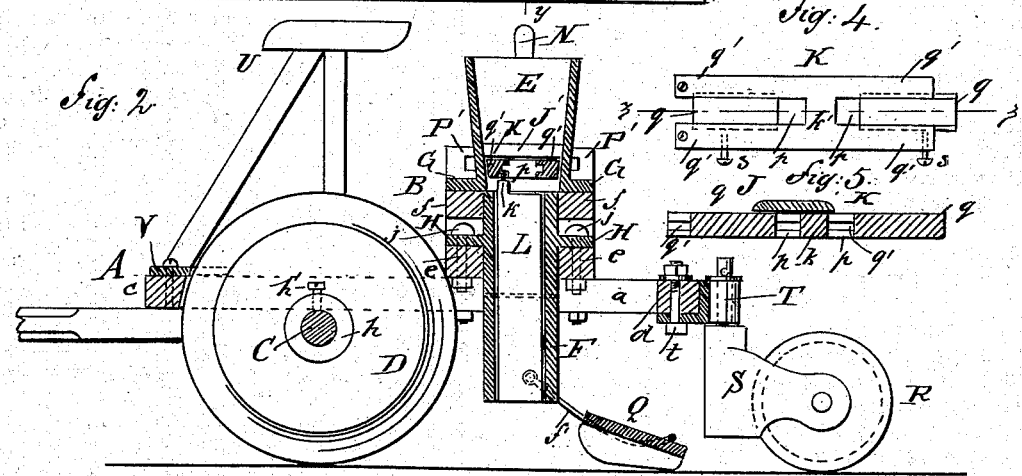
Figure 3:
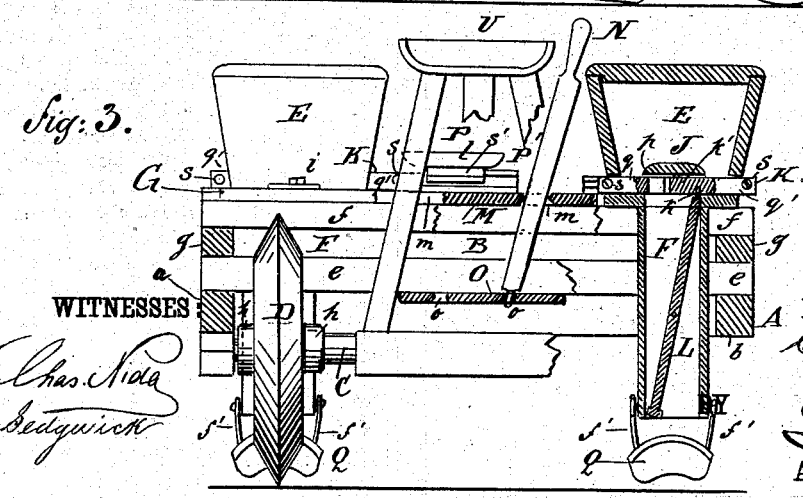

Figure 1 is a broken plan view of my new and improved seed-planter. Fig. 2 is a sectional elevation taken on the line $xx$ of Fig. 1. Fig. 3 is a transverse sectional elevation taken on the line $yy$ of Fig. 1. Fig. 4 is a plan view of one of the seed-dropping slides; and Fig. 5 is a sectional elevation of the same, taken on the line $zz$ of Fig. 4.

This invention relates to that class of seed-planters in which the seed-dropping mechanism is reciprocated by hand, and has for its object to provide a planter which shall be lighter of draft and more durable than those in use, and one which may be easily adjusted for seeds of different sizes, and for planting rows of any desired width, and one which may be easily arranged for planting with equal facility on wet or dry ground, as hereinafter fully described, and pointed out in the claims.

Referring to the drawings, A represents the main wooden frame of the machine, which is composed of the side bars, $a\,b$, and the forward and rear bars, $c\,d$. Upon the side bars, $a\,b$, of this main frame A, a short distance in front of the rear bar, $d$, is bolted the frame B, which is built up of the two lower wooden bars, $e\,e$, the two upper bars, $ff$, and the end blocks, $g\,g$, placed between the bars $e\,e$ and $ff$ at their ends, as shown in Fig. 3, and in front of this frame B is secured to the under side of the side bars, $a\,b$, of the main frame the axle C, upon which is placed loosely the sharp-edged furrow-cutting wheels D D, which cut the furrows in the ground for receiving the hills of grain. These wheels are held in place upon the axle by means of the movable collars $h\,h$, which are placed on the axle on both sides of the wheels and held to the axle by means of the set-screws $h'\,h'$, as clearly indicated in Figs. 1, 2, and 3.

E E are the seed-hoppers—one for each furrow-cutting wheel D—held upon the frame B immediately in rear of the furrow-cutting wheels, and F F are the delivery-spouts, leading from the hoppers down near to the surface of the ground, as shown in Figs. 2 and 3. The hoppers E E are each provided with the slotted flanges G G, by which they are secured by means of the bolts $i\,i$ (see Fig. 3) upon the upper side of the bars $ff$ of the frame B, and the delivery-spouts F F are each provided with flanges H H, by which they are secured by means of the bolts $j\,j$ upon the upper side of the bars $e\,e$ of the said frame B, as shown clearly in Fig. 2.

Within each of the hoppers are secured the central plates, J J, under which the dropping-plates K K slide, and within the delivery-spouts are pivoted the valves L L, which are operated for opening and closing the lower ends of the delivery-spouts by the movement of the dropping-plates K K, the pins $k\,k$ of the valves entering suitable holes in the under side of the dropping-plates, as shown in Figs. 2 and 3. The dropping-plates K K are attached at their inner ends to the plate M, and are adapted to be moved through the hoppers for dropping the grain in small quantities into the delivery-spouts by a person reciprocating the lever N, which is fulcrumed at its lower end in one or other of the holes $o\,o$ in the stationary plate O, and passes up through one or the other of the holes $m\,m$ in the plate M, in convenient position for a person to operate it while sitting on the seat P. Each of the dropping-plates K are formed with two small grain-receptacles, $p\,p$, and the size of these receptacles may be varied to suit the size of the seed being planted and the quantity to be dropped into each hill by adjusting the tongued blocks $q\,q$, which slide in and between the grooved arms $q'\,q'\,q'\,q'$ of the main body-pieces $k'$ of the dropping-plates, as illustrated in Fig. 4.

$s\,s$ are set-screws passing through two of the arms $q'\,q'$, for holding the blocks $q\,q$ at any desired position. The series of holes $i'\,i'$ are formed in the plate M at its ends, as shown in Fig. 1, so that the distance of movement of the dropping-plates K K through the hoppers E E may be varied, as found necessary, by shifting the bolts.

The bolts $j\,j$, which hold the delivery-spouts F F upon the bars $e\,e$, pass through the slots $e'\,e'$ made through the bars $e\,e$, which slots are of considerable length, for the purposes hereinafter mentioned.

Attached to the lower ends of the spouts F F by means of the bails $f'$ $f'$ are the concaved covering-plates Q Q, which gather the dirt back into the furrows made by the wheels and cover the seed, and to the rear bar, $d$, of the main frame A are attached the concaved covering or pressing wheels R R. These wheels are journaled in the standards S S, which are swiveled in the bracket-plates T T, which are secured to the rear bar, $d$, by the bolts $t$ $t$, which pass through them and through the slots $d'$ $d'$ made through the said rear bar, $d$, as shown in Fig. 1. These wheels are for the purpose (in case the soil is dry) of pressing the dirt gathered back into the furrows by the covering-plates Q down into the furrow, and thus completely and closely cover the seed. In case the soil is wet these wheels will be moved in the slots $d'$ $d'$, so as to run out of line, to one side or the other, of the covering-plates and wheels D, as in such case the soil, if pressed into the furrows, is liable to bake in the sun and retard the sprouting and growth of the seeds.

To adjust the machine for planting different widths of rows, it is only necessary first to loosen the set-screws of the collars $h$ $h$ and move the furrow-cutting wheels D D to or from each other on the axle, and secure them in place thereon by the said collars and set-screws, and then to loosen the bolts $j$ $j$ and move the delivery-spouts F F upon the bars $e$ $e$ to correspond, so as to come in line with the wheel D D, the slots $e'$ $e'$ permitting this adjustment. If the wheels D D are to be used for pressing the dirt into the furrows, they will next be moved into line by loosening the bolts and moving them one way or the other in the slots $d'$ $d'$. If these wheels are not to be used, they will be moved in the slots $d'$ $d'$ out of line with the wheels D D and covering-plates Q Q, as above mentioned.

The manner of using the machine is obvious from the drawing and the above description.

The seat P, on which the person who reciprocates the lever N sits, is provided upon its lower side with the tongued block $s'$, which is held by and moves in the grooved blocks P' P', secured upon the upper side of the bars $f$ $f$ of the frame B, between the hoppers E E, so that the seat may be moved to suit the convenience of the operator, and so that the lever N may be placed in either of the holes $m$ and $o$, in accordance with the direction of movement of the machine.

U is the seat, upon which the driver sits, and V V represent adjustable cleaning-plates secured to the front bar, $c$, of the main frame, for cleaning the wheels D D, as will be clearly understood from Fig. 1.

Thus constructed, it will be seen that the machine is of easier draft than the machines in common use, since the wheels D D will not offer so much resistance as plow-points for forming the furrows; and the wheels are also more durable than the plow-points, thus rendering the machine more durable than those in common use. Besides these advantages, the adjustments of the machine and dropping mechanism are very easily made, and by the use of the wheels R R the machine is well adapted to be used both on wet and dry ground.

Having thus described my invention, what I claim as new, and desire to secure by Letters Patent, is—

1. In a seed-planter, the combination, with the frame A, the shaft $c$, and the furrow-opening wheels D, adjustably secured on said shaft, of the frame B, having its cross-bar $e$ slotted, the spouts F, provided with the flanges H and the bolts $j$, substantially as herein shown and described.

2. In a seed-planter, the combination, with the frame A, the axle C, and the furrow-opening wheels, adjustably secured thereon by collars $h$ and set-screws $h'$, of the cross-bars $e$ of the frame B, provided with slots $e'$, the spouts F, provided with the flanges H, and the bolts $j$, substantially as and for the purpose set forth.

3. In a seed-planter, the combination, with the frame A, having the covering-wheels R, adjustably secured to its rear cross-bar, the shaft C, and the furrow-opening wheels D, adjustably secured to its shaft, of the frame B, having its lower bar slotted, the dropping-spouts F, provided with flanges H, and the bolts $j$, substantially as and for the purpose set forth.

4. In a seed-planter, the combination, with the frame B, the plate O, secured to the under side of the said frame and provided with the apertures $o$, the hoppers E, and spouts F, of the plate M, provided with the holes $m$, the adjustable seed-plates K, secured to the ends of the said plate M, the valve-plates L, pivoted in the spouts, and provided with pins $k$, entering holes in the under side of the seed-plates, and the lever N, substantially as herein shown and described.

CHARLES LEE. [L. S.]

Witnesses:
 JOHN A. MCCONNELL,
 BARBARA A. MCCONNELL.